United States Patent
Park et al.

(10) Patent No.: US 9,697,214 B2
(45) Date of Patent: Jul. 4, 2017

(54) DEVICE AND METHOD FOR MANAGING LIFESPAN OF CONTENT, AND SYSTEM USING THE SAME

(71) Applicant: Melephant Inc., Seongnam-Si (KR)

(72) Inventors: Jae Hwan Park, Yongin-si (KR); Jae Won Lim, Seoul (KR)

(73) Assignee: MELEPHANT INC., Seongnam-si (KR)

( * ) Notice: Subject to any disclaimer, the term of this patent is extended or adjusted under 35 U.S.C. 154(b) by 289 days.

(21) Appl. No.: 14/519,335

(22) Filed: Oct. 21, 2014

(65) Prior Publication Data

US 2015/0302043 A1 Oct. 22, 2015

(30) Foreign Application Priority Data

Apr. 18, 2014 (KR) .......................... 10-2014-0046736
Sep. 30, 2014 (KR) .......................... 10-2014-0131446

(51) Int. Cl.
*G06F 17/30* (2006.01)

(52) U.S. Cl.
CPC .. *G06F 17/30085* (2013.01); *G06F 17/30017* (2013.01)

(58) Field of Classification Search
None
See application file for complete search history.

(56) References Cited

U.S. PATENT DOCUMENTS

| | | | |
|---|---|---|---|
| 6,597,459 B2 | 7/2003 | Demarest | |
| 7,574,442 B2 | 8/2009 | Takeda et al. | |
| 8,200,269 B2 | 6/2012 | Takeda et al. | |
| 2007/0135135 A1* | 6/2007 | Brown | H04M 1/72572 455/456.1 |
| 2008/0092046 A1 | 4/2008 | Bae | |
| 2008/0153540 A1* | 6/2008 | Brown | H04M 1/72572 455/550.1 |
| 2009/0271871 A1* | 10/2009 | Nied | G06F 21/6218 726/28 |
| 2010/0287588 A1* | 11/2010 | Cox | H04N 5/44543 725/40 |
| 2013/0332838 A1* | 12/2013 | Naggar | G06Q 30/06 715/733 |
| 2014/0013353 A1* | 1/2014 | Mathur | G06F 17/30867 725/34 |
| 2014/0108559 A1* | 4/2014 | Grochowicz | H04N 21/4622 709/206 |
| 2015/0026001 A1* | 1/2015 | Gu | G06F 17/30029 705/26.7 |

FOREIGN PATENT DOCUMENTS

| | | |
|---|---|---|
| JP | 2003-177991 | 6/2003 |
| JP | 2006-048146 | 2/2006 |
| KR | 1020070055472 | 5/2007 |
| KR | 100790537 | 12/2007 |
| KR | 100814090 | 3/2008 |
| KR | 101258387 | 4/2013 |

* cited by examiner

*Primary Examiner* — Debbie Le
(74) *Attorney, Agent, or Firm* — Lex IP Meister, PLLC

(57) ABSTRACT

A content lifespan management device assigns a life to a first content based on a user preference for the first content. The content lifespan management device extends or shortens a lifespan of the first content based on the user preference of the first content that is calculated after the life is assigned to the first content.

18 Claims, 6 Drawing Sheets

DEVICE AND METHOD FOR MANAGING LIFESPAN OF CONTENT, AND SYSTEM USING THE SAME

CROSS-REFERENCE TO RELATED APPLICATION

This application claims priority to and the benefit of Korean Patent Application No. 10-2014-0046736 and 10-2014-0131446 filed in the Korean Intellectual Property Office on Apr. 18, 2014 and Sep. 30, 2014, the entire contents of which are incorporated herein by reference.

BACKGROUND OF THE INVENTION (a) Field of the Invention

The present invention relates to a method and a device for managing a lifespan of content.

(b) Description of the Related Art

Content (digital content) refers to data, information, and the like in which code, text, voice, sound, image, video, etc. are digitally produced, processed, and distributed for use in wired and wireless telecommunication networks.

Recently, with the rapid advent of the information technology (IT) society, numerous contents are produced and distributed daily such that the culture of human beings is enriched, but content overload has also reached a level that is hardly negligible.

For example, there are numerous contents which exist only on servers which limits new storage capacity of the servers, even if the contents are virtually useless because their effective lifespans expire or users are no longer interested in them, such that users who use the contents take an excessive amount of time and effort to search for necessary contents.

Meanwhile, there is virtually no related art in which evaluation (preference) of social members (users) for the content is reflected to determine whether to assign a life to the content or not, and there is a problem that a lifespan of the content (an existing period) is determined only by passage of an absolute time (a physical time accepted in reality).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a device for determining whether to assign a life to a content and a lifespan (an existing period) of the content based not on an absolute time (a physical time accepted in reality) but on evaluation (preference) of social members (users) for the content.

According to an exemplary embodiment of the present invention, a content lifespan management device is provided.

The content lifespan management device includes: a life assigning processor for assigning a life to a first content based on a user preference for the first content; and a lifespan adjustor for extending or shortening a lifespan of the first content based on the user preference of the first content that is calculated after the life is assigned to the first content when the life is assigned to the first content.

The first content may be present in a content storage device such that the first content can be used by users when the life is assigned to the first content.

The life assigning processor may assign the life and the lifespan which is a period in which the first content can be used by users to the first content when the user preference for the first content collected for a first period exceeds a threshold value.

The life assigning processor may calculate preference ranks using the user preferences for the first content and contents of the same category as the first content collected for a first period, and may assign the life and the lifespan corresponding to the user preference for the first content to the first content when the user preference for the first content corresponds to a preference ranking that exceeds a threshold value.

The user preference may be calculated based on at least one of the number of users who marks "like" of the first content, the number of comments written for the first content, the number of the first content used, and an inputted rating for the first content.

The content lifespan management device may further include a life indicator for visually displaying a ratio of the lifespan assigned to the first content to a residual lifespan of the first content using at least one of a first method in which noise is inserted in the first content, a second method in which data of the first content is partially deleted, a third method in which a filter effect for making the first content look aged is applied to the first content, and a fourth method in which a resolution of the first content is reduced.

The life indicator may visually display the residual lifespan of the first content and an overall survival time that represents a time from when the life is assigned to the first content to when the residual lifespan of the first content expires.

The content lifespan management device may include: a revitalization determination processor for determining whether the first content needs to be revitalized or not when the life is not assigned to the first content or when the lifespan of the first content expires; and a preference evaluator for allowing the first content to be usable by users and then evaluating the user preference for the first content when the first content needs to be revitalized.

The content lifespan management device may further include: a pre-evaluator for calculating a pre-evaluation score for the first content, before the user preference for the first content is evaluated, based on at least one of the number of previous content uploads by a first user who uploads the first content and a survival time of a content that the first user previously uploaded; and a preference point calculator for calculating a preference point that is to be applied to the user preference for the first content when the pre-evaluation score for the first content exceeds a threshold value.

According to another exemplary embodiment of the present invention, a content lifecycle management method of a content lifespan management device for managing a lifespan of a first content is provided.

The contents lifecycle management method includes: evaluating a user preference for the first content; assigning a life and a lifespan to the first content based on the user preference of the first content; extending or shortening the lifespan of the first content based on the user preference of the first content that is calculated after the life is assigned to the first content when the life is assigned to the first content; and visually displaying aging of the first content based on a ratio of a total lifespan of the first content to a residual lifespan thereof.

According to another exemplary embodiment, a content lifespan management system is provided. The content lifespan management system includes: a content server for providing first content to a plurality of users; and a content lifespan management device configured to assign a life and a lifespan to the first content based on a user preference for the first content that is provided by the content server and to extend or shorten the lifespan of the first content based on the user preference of the first content that is calculated after the life is assigned to the first content when the life is assigned to the first content.

The content lifespan management device may mark one of gold-colored, silver-colored, and bronze-colored edges corresponding to the overall survival time of the first content to the first content.

DETAILED DESCRIPTION OF THE EMBODIMENTS

Figure 1:
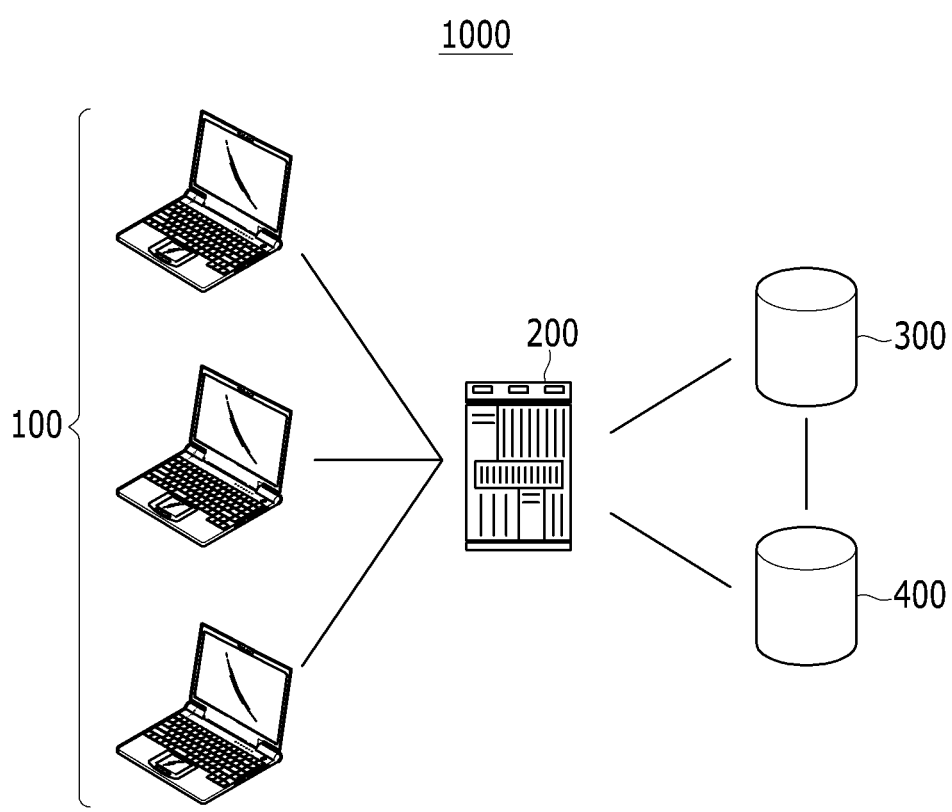
FIG. 1 is a drawing for describing a content lifespan management system according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

FIG. 1 is a drawing for describing a content lifespan management system according to an exemplary embodiment of the present invention.

The content lifespan management system 1000 includes a user terminal 100, a content server 200, a content lifespan management device 300, and a content database 400.

The user terminal 100 may connect to the content server 200 to provide or to be provided with content.

Specifically, the user terminal 100 may connect to the content server 200 through an ID (or an email address) and a password that are registered to the content server 200.

One or more user terminals 100 may be present.

The user terminal 100 may be an Internet accessible desktop PC (personal computer), a smartphone, a notebook computer, a PDA (personal digital assistant), a tablet PC, etc.

Meanwhile, the contents (hereinafter, 'content') may be various kinds of video files, image files, MP3 music files, multimedia books, etc. that have recently been in the spotlight.

The content server 200 stores the contents uploaded from the user terminal 100 in the content database 400, and manages the contents.

Specifically, the content server 200 may allow the contents stored in the content database 400 to be played or downloaded by request of the user terminal 100.

For each content provided by the content server 200, the content lifespan management device 300 assigns a life to the content depending on user preference (e.g., "like", "dislike", etc.) that is collected for a predetermined time, and adjust a lifespan of the content to which the life is assigned in real time.

Specifically, the content lifespan management device 300 may determine whether to assign the life to the content or not depending on whether the user preference of the content exceeds a predetermined level.

For example, when the user preference for the content collected for the predetermined time is less than a threshold value, the content lifespan management device 300 does not assign the life to the content.

As another example, when the user preference for the content exceeds the threshold value, the content lifespan management device 300 assigns the life to the content.

Alternatively, the content lifespan management device 300 may determine whether to assign the life to the content or not depending on a user preference ranking for the content that is collected for the predetermined time.

Specifically, the content lifespan management device 300 may assign the life to the content having the highest user preference among the contents.

Alternatively, the content lifespan management device 300 may assign the life to the specified number of the contents with high-ranked user preferences while not assigning the life to a remainder of the contents.

For example, when a first user uploaded one content to the content server 200 to boast of one's strong point and ten other users upload their contents that they claim are superior to content of the content (a strong point of the first user) that the first user uploaded to the content server 200, the eleven contents of the same category are uploaded to the content server 200 (supposing that each user uploads one content).

When the unspecified number of users who view the eleven contents each selects his/her favorite content among the eleven contents (for example, "like", one user may select multiple contents in this case), only three contents that are more chosen than the others can survive among the eleven contents after the predetermined time elapses, while the remainder of the contents to which the life is not assigned cannot not survive.

Not assigning the life to the content may include at least one of deleting the content from the content server 200 or the content database 400, allowing the content to be present in the content server 200 but to be deleted from a place where the content is posted (referred to as a "site"), and allowing the content to be present in the content server 200 but to be seen as deleted by users.

As such, a data storage space of the content server 200 can be efficiently allocated and de-allocated.

Meanwhile, assigning the life to the content may include allowing the content to remain in the content server 200 or the content database 400 such that the content can be used by users.

In this case, it is preferable for an operation of assigning the life to the content to be performed after a predetermined time set by the system is elapsed since the content is uploaded to the content server 200.

The user preference may be collected for the predetermined time, and the user preference collected may be used as an indicator for determining whether the content lifespan management device 300 should assign the life to the content or not.

The content lifespan management device 300 may extends a lifespan of the content to which the life is assigned by a time corresponding to a user preference level that can be detected in real time (for example, the number of user who selects "like" if "like" selection is possible), or may reduce the lifespan of the content by a time corresponding to a user dislike level that can be detected in real time (for example, the number of users who select "dislike" if "dislike" selection is possible).

For example, when a first content is uploaded to the content server 200 by a first user and the life is assigned to the first content by preferences of 24 unspecified users, the lifespan for surviving in the content server 200 for 24 hours (=24 users×1 hour, or 24 minutes or 24 years depending on a unit time setting) is assigned to the first content after the life is assigned.

However, after the lifespan is assigned, when 10 dislikes of 10 unspecified users occurs for the first content, the lifespan of the first content is shortened by 10 hours (=10×1 hour, or 10 minutes or 10 years depending on the unit time setting) to be 14 hours (=24−10 hours).

Accordingly, the surviving contents may be evaluated as the contents having a high social preference such that they can have continuous/additional user preference selections (selection/indication of the user preferences for the contents), thereby extending the lifespan of each content by a degree of selection.

When the lifespans of the contents expire, the contents to which no further preference selections are made may be deleted from the content server 200, may be present in the content server but be deleted from the place where the contents are posted (referred to as the "site"), or may be present in the content server 200 but seen to be deleted by users.

In addition, the content lifespan management device 300 may adjust the lifespan of the content to which the life is assigned, depending on at least one of the number of comments for the content that is detected in real-time, the number of the content called from the content server 200, the number of the content played, numbers selected by users using a digital gauge, and numbers that are directly inputted by users for the content.

Specifically, the content lifespan management device 300 may further extend the lifespan of the content as the number of comments increases, the number of the content called from the content server 200 increases, the number of the content played increases, the numbers selected by users using the digital gauge increases, and the numbers that are directly inputted by users for the content increases.

In addition, the content lifespan management device 300 may manage a residual lifespan of the content to which the life is assigned such that residual lifespan is shortened in real time as the time is elapsed, and visually display a regressive or aging phenomenon due to the shortened residual lifespan of the content.

For example, when the first content receives the preference selections from 100 unspecified users such that it is within predetermined preference rankings (for example, first to third places), it receives the life and the lifespan of 100 hours (=100 users×1 hour).

Subsequently, after 90 hours, the first content has the residual lifespan of 10 hours (=100−90 hours).

Since the time that the first content can survive is relatively limited when compared with the initially assigned 100 hours (the time that the first content can survive in the content server 200, i.e., 10 hours), the content lifespan management device 300 may visually display the regressive or aging phenomenon of the first content according to a ratio of the total life (100 hours) assigned to the first content to the residual life thereof (10 hours).

Specifically, the content lifespan management device 300 may visually display the regressive or aging phenomenon of the first content using at least one of a noise insertion method in which random noise is inserted into the actual data (file), a quality reduction method in which data is randomly deleted from the actual data (file) of the first content, a filter effect method in which a filter effect is applied to the first content (for example, an old film effect, a blur effect, etc.) to make the first content appear to look aged, and a resolution regression method in which a resolution of the first content is reduced.

In addition, the content lifespan management device 300 may visually display how many preference selections of the content are received or how long the preference selections are continually received when the content remains in the content server 200 or the content database 400 for a long time, since it receives a large number of preference selections or continually receives the preference selections for a long time from users.

Thereby, users may recognize how long the content has lived and how long it will exist.

Specifically, the content lifespan management device 300 may visually display the lifespan that is initially assigned to the content, the current residual lifespan of the content (i.e., a minimum time for which it exists), and an overall survival time of the content.

In this case, the current residual lifespan of the content and the overall survival time of the content can be updated in real time.

For example, when a second content currently has a residual lifespan of 200 hours, 100 hours have passed since the life is initially assigned, and additional preference selections from 100 users are made since the life is initially assigned, it can be assumed that the lifespan of 200 hours (=200 users×1 hour) is initially assigned to the second content since preference selections from 200 users are received.

In addition, since the current residual lifespan of the second content is 200 hours, the overall survival time of the second content is 300 hours (=200 hours+100 hours) when the residual lifespan of the second content expires.

In order to visualize the initially assigned lifespan (200 hours), the residual lifespan of the second content (200 hours), and the overall survival time of the second content (300 hours), the content lifespan management device 300 may mark one of a gold-colored edge (representing a life of more than 10 years), a silver-colored edge (a life of more than one year), and a bronze-colored edge (a life of more than one month), which correspond to the overall survival time of the second content, to the second content.

Alternatively, the content lifespan management device 300 may mark the residual lifespan of the second content (200 hours), the initially assigned lifespan of the second content (200 hours), and the overall survival time of the second content (300 hours) with text at one corner of the second content or thereabove or therebelow.

Meanwhile, the content lifespan management device 300 may provide a chance in which the user preference of the content, which remains in the content server 200 but is deleted in the place where it is posted (the site), or remains in the content server 200 but is processed to be seen as deleted by users, is re-evaluated through a special event.

For example, when the lifespan of a third content expires and the third content is processed to be seen as deleted to users but is not actually deleted from the content server 200, the content lifespan management device 300 may determine whether the third content needs to be revitalized or not.

When determining that the third content needs to be revitalized, the content lifespan management device 300 may collect the user preference for the third content for the predetermined time and revitalize the third content according to the collected user preference of the third content.

As such, by determining that the third content is too precious to be socially lost and is worthy of drawing social attention again, etc., the content lifespan management device 300 may revitalize the third content that is already regarded as being socially disappeared.

Meanwhile, the content lifespan management device 300 may include a database management system (DBMS).

The DBMS may have features to manage the database such as data insertion, update, deletion, query, etc.

The content database 400 interworks with the content server 200 and the content lifespan management device 300.

Specifically, the content database 400 may store the contents uploaded from the user terminal 100 connected to the content server 200, content lifecycle information provided by content lifespan management device 300, and the like.

The content database 400 and the content lifespan management device 300 may be synchronized with each other.

The information stored in the content database 400 may be updated in real time.

Meanwhile, prior to evaluating the user preference, the content lifespan management device 300 may perform a pre-evaluation for the content provided by the content server 200 for the predetermined period.

The content lifespan management device 300 may apply a preference point to the user preference of the content if a pre-evaluation score of the content exceeds a predetermined level.

For example, the content lifespan management device 300 may perform the pre-evaluation for a fourth content depending on the number of previous content uploads by the second user who uploads the fourth content, the survival time of the content that the second user previously uploaded, reactions of users for the content that the second user previously uploaded, whether the previous content or the fourth content of the second user includes social issues or not, etc.

The content lifespan management device 300 may apply the preference point to the user preference of the fourth content if the pre-evaluation score of the fourth content exceeds the threshold value.

When the preference point is assigned to the fourth content, the content lifespan management device 400 may determine whether the life should be assigned to the fourth content depending on the user preference to which the preference point is applied.

As such, the fourth content to which the predetermined preference point is assigned may compete with other contents while taking a favorable position by the preference point.

Figure 2A:
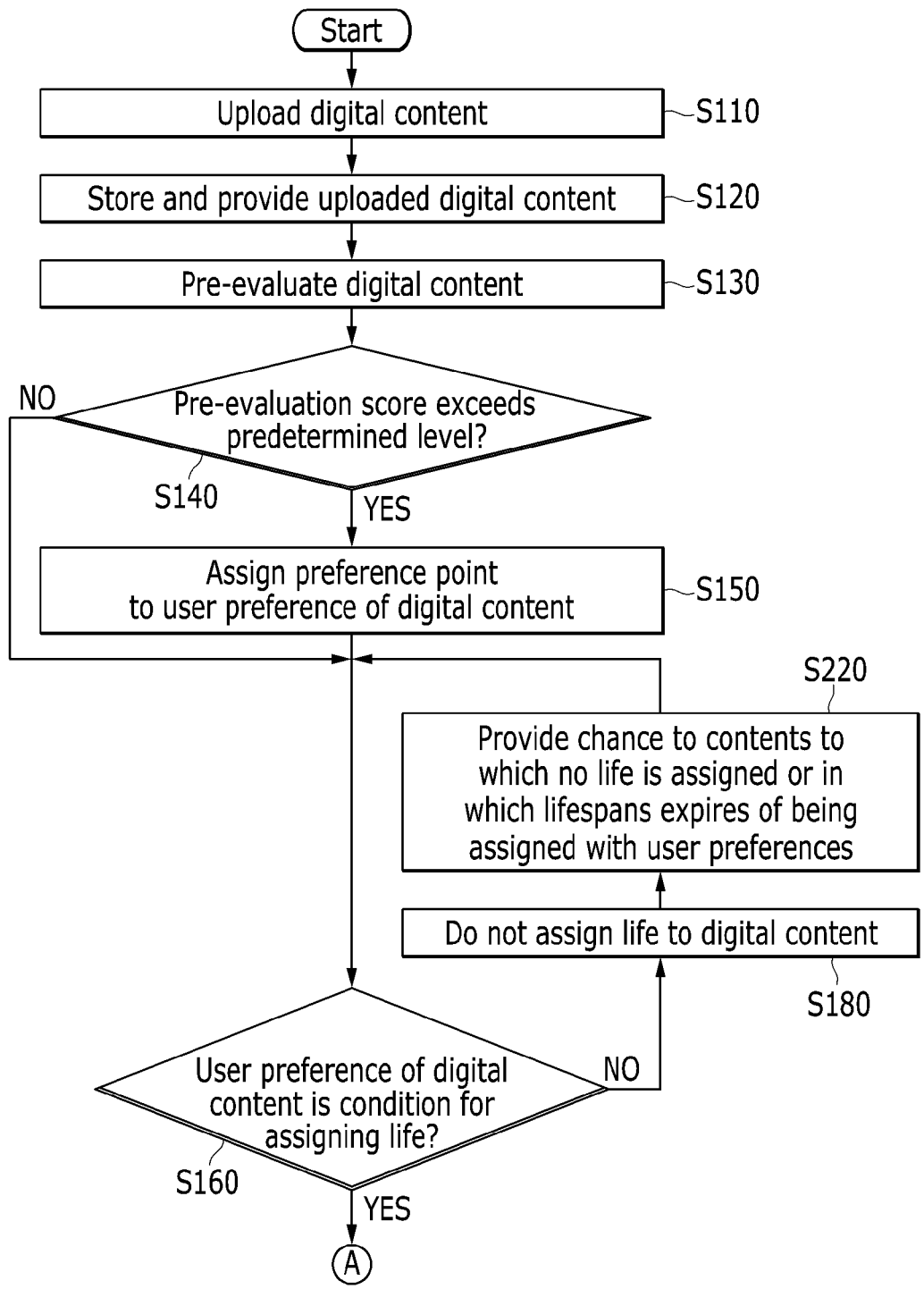
FIG. 2A and FIG. 2B are flowcharts for illustrating a content lifecycle management method according to an exemplary embodiment of the present invention.
Figure 2B:
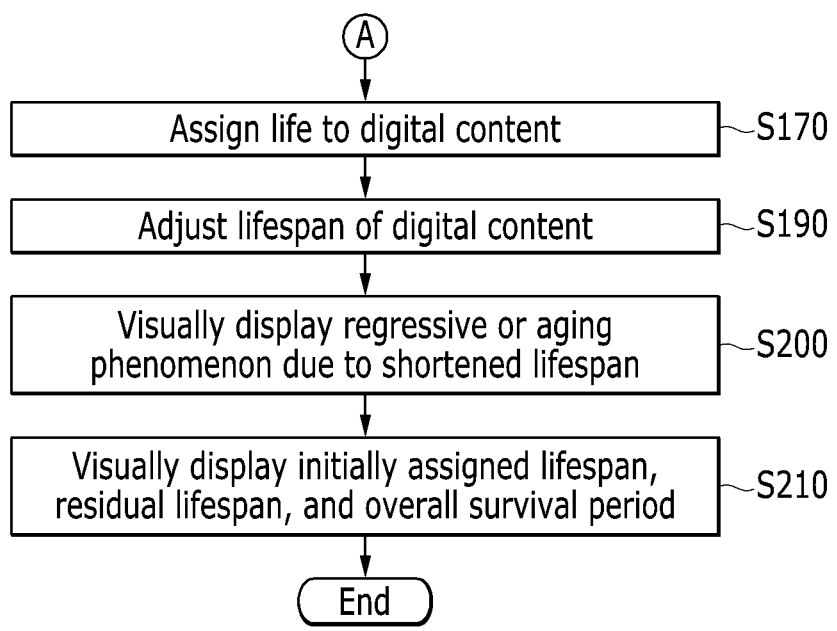

FIG. 2A and FIG. 2B are flowcharts for illustrating a content lifecycle management method according to an exemplary embodiment of the present invention.

First, a user terminal 100 of a third user connects to a content server 200 through an ID (or email address), a password, etc. that are registered in the content server 200, and uploads contents thereto (S110).

For ease of description, fifth content refers to content that the user terminal 100 of the third user uploads in the step S110.

The content server 200 stores and manages the fifth content uploaded from the user terminal 100 in a content database 400 (S120).

The content server 200 allows the fifth content stored in the content database 400 to be played or downloaded when a request of another user terminal 100 is received.

A content lifespan management device 300 performs a pre-evaluation for the fifth content that is provided by the content server 200 (S130).

When a pre-evaluation score of the fifth content exceeds a predetermined level (S140), the content lifespan management device 300 assigns the preference point to the user preference for the fifth content (S150).

Specifically, the content lifespan management device 300 may perform the pre-evaluation for the fifth content based on the number of previous content uploads by the third user, the survival time of the content that the third user previously uploaded, reactions of users for the content that the third user previously uploaded, whether the previous content or the fifth content of the third user includes social issues or not, etc.

The content lifespan management device 300 assigns a life to the fifth content based on a user preference of the fifth content (for example, 'like', 'dislike', etc.) that is provided by the content server 200 (S160, S170, and S180).

Specifically, the content lifespan management device 300 may assign the life to the fifth content when the user preference of the fifth content collected for a predetermined time exceeds a predetermined level, and may not assign the life to the fifth content when the user preference of the fifth content does not exceed the predetermined level.

Alternatively, the content lifespan management device 300 may assign the life to the fifth content based on user preference rankings of the various contents that are collected for the fixed time.

For example, the content lifespan management device 300 may assign the life to the fifth content if the fifth content has the highest user preference among the various contents or the user preference of the fifth content is ranked above a predetermined user preference ranking.

When the life is assigned to the fifth content, the fifth content may have a lifespan corresponding to its user preference.

Alternatively, when the life is assigned to the fifth content, the fifth content may have the lifespan corresponding to the predetermined time.

When the life assigned to the fifth content, the content lifespan management device 300 may extend the lifespan of the fifth content by a time corresponding to real-time detectable user preference levels (for example, the number of users who selected 'like' when 'like' is selectable), or may reduce the life-cycle of the fifth content by a time corresponding to real-time detectable user dislike level (for example, the number of users who selected 'dislike' when 'dislike' is selectable) (S190).

Alternatively, the content lifespan management device 300 may adjust the life-cycle of the fifth content based on at least one of the number of comments that is real-time detectable, the number of the fifth contents called from the content server 200, the number of the fifth contents played, the number selected by the user using a digital gauge, and the number directly input by the user.

The content lifespan management device 300 manages that a residual lifespan of the fifth contents to which the life is assigned is shortened as time is elapsed, and may visually display a regressive or aging phenomenon due to the shortened residual lifespan of the fifth contents (S200).

In addition, the content lifespan management device 300 may visualize the assigned life when the initial life is assigned to the fifth contents, the current residual lifespan of the fifth contents, and a survival time of the fifth contents (S210).

In this case, the current residual lifespan of the fifth contents and the survival time of the fifth contents may be updated in real time.

Meanwhile, the content lifespan management device 300 determines a need for revitalizing the fifth contents when the life is not assigned to the fifth contents or the life-cycle of the fifth content expires (S220).

Specifically, the content lifespan management device 300 may determine whether the fifth contents needs to be revitalized or not when the fifth contents is not completely removed from the content server 200 (for example, when the fifth contents remains in the content server 200 but is seen to be deleted in a place where it is posted or processed to be seen as deleted by the users).

The content lifespan management device 300 may provide a chance of reassigning (re-evaluating) the user preference to the fifth content through a special event when the fifth content needs to be revitalized.

When the fifth content gets the chance of being revitalized, the content lifespan management device 300 may collect the user preference of the fifth content for the predetermined time after allowing the fifth content to be used by the user.

The content lifespan management device 300 reassigns the life to the fifth content based on the collected user preference of the fifth content (S160, S170, and S180).

Figure 3:
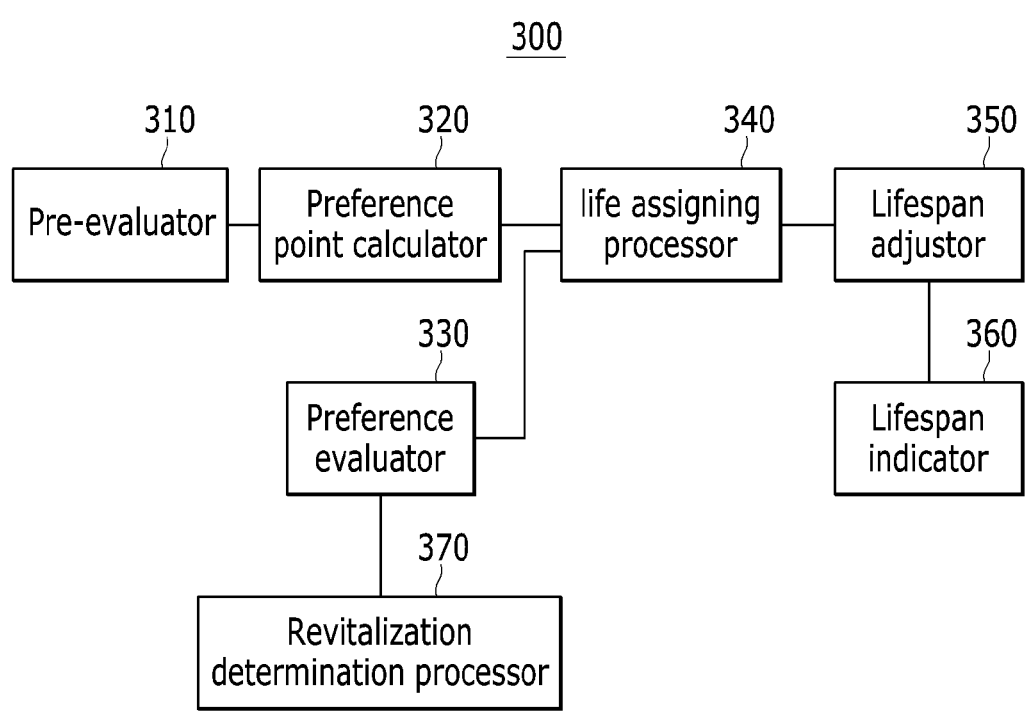
FIG. 3 is a drawing for illustrating a configuration of a content lifespan management device.

FIG. 3 is a drawing illustrating a configuration of a content lifespan management device.

Specifically, the content lifespan management device 300 of FIG. 3 may perform the procedures, the functions, and the methods that are related to the content lifespan management device 300 described above in FIGS. 1 to 2B.

The content lifespan management device 300 includes a pre-evaluator 310, a preference point calculator 320, a preference evaluator 330, a life assigning processor 340, a lifespan adjustor 350, a lifespan indicator 360, and a revitalization determination processor 370.

The pre-evaluator 310 performs a pre-evaluation of the content before the user preference of the content is evaluated by the preference evaluator 330.

Specifically, the pre-evaluator 310 may perform operations related to the pre-evaluation for the content described in FIGS. 1 to 2B.

When a pre-evaluation score of the content calculated by the pre-evaluator 310 exceeds the threshold value, the preference point calculator 320 calculates the preference point that is to be applied to the user preference of the content.

Specifically, preference point calculator 320 may perform the operations related to the preference point application (assignment) described above in FIGS. 1 to 2B.

The preference evaluator 330 evaluates the user preference for the content.

Specifically, the preference evaluator 330 may collect the user preference for the content for the predetermined period.

The preference evaluator 330 may perform the operations related to the user preference evaluation (collection) described above in FIGS. 1 to 2B.

The life assigning processor 340 assigns the life to the content based on the user preference of the content.

Specifically, the life assigning processor 340 applies the preference point of the content calculated by the preference point calculator 320 to the user preference of the content that is calculated by the preference evaluator 330, and may assign the life to the content when the applied result (for example, the user preference+the preference point) exceeds the threshold value.

The life assigning processor 340 may assign a lifespan (the period in which the content can be used by users) corresponding to the applied result (for example, the user preference+the preference point) or a predetermined fixed lifespan after the life is assigned to the content.

The life assigning processor 340 may perform the operations related to assigning the life to the content described above in FIGS. 1 to 2B.

The lifespan adjustor 350 extends or shortens the lifespan of the content after the life is assigned to the content based on the user preference of the content that is calculated by the preference evaluator 330.

Specifically, the lifespan adjustor 350 may perform the operations related to adjusting the lifespan of the content (extending, shortening, etc.) described above in FIGS. 1 to 2B.

The life indicator 360 may visually display a regressive or aging phenomenon of the content based on a ratio of the total life to the residual life of the content.

In addition, the life indicator 360 may visually display an initially assigned life, a residual life, and an overall survival time of the content.

Specifically, the life indicator 360 may perform the operations related to visualizations of an aging phenomenon of the content and the lifespan of the contents that are described above in FIGS. 1 to 2B.

The revitalization determination processor 370 determines whether the content needs to be revitalized when the life is assigned to the content by the life assigning processor 340 or when the life is assigned to the content but the lifespan of the content expires.

When the content get a chance of being revitalized by the revitalization determination processor 370, the user preference may be re-evaluated by the preference evaluator 330.

The revitalization determination processor 370 may perform the operations related to revitalization of the content described above in FIGS. 1 to 2B.

Figure 4:
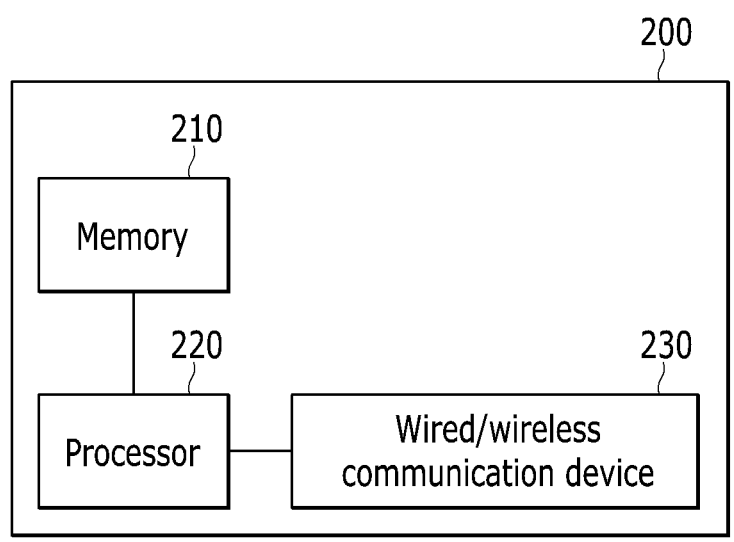
FIG. 4 is a drawing for illustrating a configuration of a content server.

FIG. 4 is a drawing for illustrating a configuration of a content server.

The content server 200 includes a memory 210, a processor 220, and a wired/wireless communication device 230.

The processor 220 may be configured to implement the procedures, functions, and methods related to the content server 200 that is described in FIGS. 1 to 2B.

The memory 210 is connected to the processor 220, and stores various information related to an operation of the processor 220.

The wired/wireless communication device 230 is connected to the processor 220, and receives or transmits a wired or wireless signal.

Figure 5:
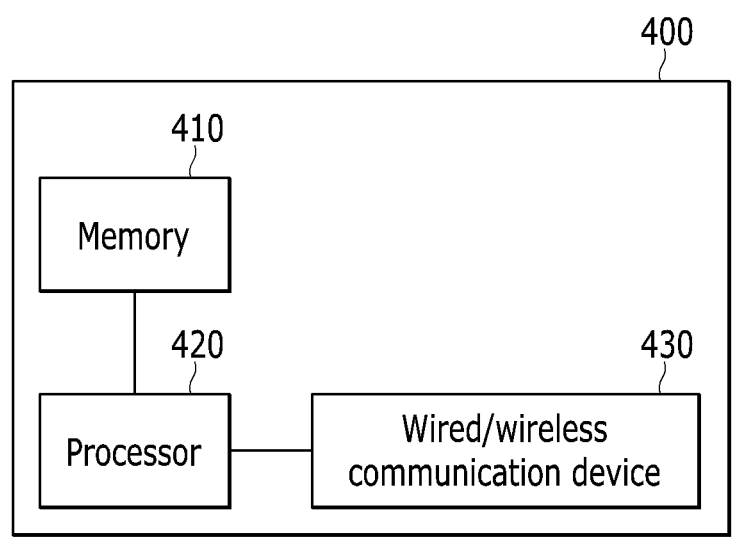
FIG. 5 is a drawing for illustrating a configuration of a content database.

FIG. 5 is a drawing for illustrating a configuration of a content database.

The content database 400 includes a memory 410, a processor 420, and a wired/wireless communication device 430.

The processor 420 may be configured to implement the procedures, functions, and methods related to the content database 400 that is described in FIGS. 1 to 2B.

The memory 410 is connected to the processor 420, and stores various information related to an operation of the processor 420.

The wired/wireless communication device 430 is connected to the processor 420, and transmits or receives a wired or wireless signal.

Meanwhile, according to the aforementioned exemplary embodiment of the present invention, the content having survived for a long time can be regarded as the content of the high social preference, and can have various feedbacks representing corresponding social attention such as comments and the like.

Such feedbacks can be regarded as the life and experience value of the content, and the experience value adds a value to the corresponding content.

As a result, as the content has the value, the content has a meaning as one living life in a digital world.

In addition, according to the aforementioned exemplary embodiment of the present invention, the lifespan corresponding to the time that corresponds to evaluation of members of society for the content (social choice or social preference) can be assigned to the content.

The content to which the life is assigned can survive.

In addition, according to the evaluation of the members of the society, quantitative change of an absolute time (content lifecycle change) for the lifespan of the content may continually occur even after the life is assigned.

In addition, by eliminating content to which a social choice is not made (the contents having not so high social preferences), a data storage space of the content server 200 or the content database 400 may be efficiently managed and used.

The aforementioned exemplary embodiments of the present invention can be implemented by a general-purpose digital computer for executing a program using a recording media with which the program can be written to be executable and readable by the computer.

The computer-readable recording media includes a storage media such as a magnetic storage media (for example, ROM, floppy disk, hard disk, etc.), an optical decoding media (for example, CD-ROM, DVD, etc.), and a carrier wave (for example, transmission through the Internet).

According to the exemplary embodiment of the present invention, based not on the elapse of the absolute time but on the preference of the users for the content, the lifespan corresponding to the time that corresponds to the user preference can be assigned to the content.

In addition, according to the exemplary embodiment of the present invention, even after the life is assigned to the content, the lifespan of the content can be prolonged or shortened.

Further, according to the exemplary embodiment of the present invention, only the contents that are socially chosen can be selected to be managed, and the contents that are not socially chosen can be eliminated.

As such, a space of the contents storage device can be efficiently used and managed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A content lifespan management device comprising:
a pre-evaluator for calculating a pre-evaluation score for a first content, before a user preference for the first content is evaluated, based on the number of previous content uploads by a first user who uploads the first content and a survival time of a content that the first user previously uploaded;
a preference point calculator for calculating a preference point that is to be added to the user preference for the first content when the pre-evaluation score for the first content exceeds a first threshold value;
a life assigning processor for assigning a life and a lifespan, which is a period in which the first content can be used by users, to the first content based on the user preference for the first content and the preference point; and
a lifespan adjustor for extending or shortening the lifespan of the first content based on the user preference for the first content that is calculated after the life is assigned to the first content when the life is assigned to the first content,
wherein the first content is present in a content storage device such that the first content can be used by users when the life is assigned to the first content.

2. The content lifespan management device of claim 1, the first content is deleted from the content storage device when the life is not assigned to the first content or when the lifespan of the first content expires.

3. The content lifespan management device of claim 1, wherein the life assigning processor assigns the life and the lifespan to the first content when the user preference for the first content collected for a first period exceeds a second threshold value.

4. The content lifespan management device of claim 1, wherein the life assigning processor calculates preference ranks using the user preference for the first content and user preferences for contents of the same category as the first content collected for a first period, and assigns the life and the lifespan to the first content when the user preference for the first content corresponds to a preference ranking that exceeds a second threshold value.

5. The content lifespan management device of claim 1, wherein the user preference is calculated based on at least one of the number of users who mark "like" of the first content, the number of comments written for the first content, the number of the first content used, and an inputted rating for the first content.

6. The content lifespan management device of claim 1, further comprising a life indicator for visually displaying a ratio of the lifespan assigned to the first content to a residual lifespan of the first content using at least one of a first method in which noise is inserted in the first content, a second method in which data of the first content is partially deleted, a third method in which a filter effect for making the first content look aged is applied to the first content, and a fourth method in which a resolution of the first content is reduced.

7. The content lifespan management device of claim 6, wherein the life indicator visually displays the residual lifespan of the first content and an overall survival time that represents a time from when the life is assigned to the first content to when the residual lifespan of the first content expires.

8. The content lifespan management device of claim 1, further comprising: a revitalization determination processor for determining whether the first content needs to be revitalized or not when the life is not assigned to the first content or when the lifespan of the first content expires; and a preference evaluator for allowing the first content to be usable by users and then evaluating the user preference for the first content when the first content needs to be revitalized.

9. A content lifecycle management method of a content lifespan management device for managing a lifespan of a first content, comprising:
    calculating a pre-evaluation score for the first content based on the number of previous content uploads by a first user who uploads the first content and a survival time of a content that the first user previously uploaded;
    calculating a preference point that is to be added to a user preference for the first content when the pre-evaluation score for the first content exceeds a threshold value;
    evaluating the user preference for the first content;
    assigning a life and a lifespan to the first content based on the user preference for the first content and the preference point;
    extending or shortening the lifespan of the first content based on the user preference for the first content that is calculated after the life is assigned to the first content when the life is assigned to the first content; and
    visually displaying aging of the first content based on a ratio of a total lifespan of the first content to a residual lifespan thereof,
    wherein the first content is present in a content storage device such that the first content can be used by users when the life is assigned to the first content.

10. A content lifespan management system comprising:
    a content server for providing first content to a plurality of users; and
    a content lifespan management device comprising
        a pre-evaluator for calculating a pre-evaluation score for the first content based on the number of previous content uploads by a first user who uploads the first content, a survival time of a content that the first user previously uploaded, and whether the content previously uploaded by the first user includes social issues or not,
        a preference point calculator for calculating a preference point that is to be applied to a user preference for the first content when the pre-evaluation score for the first content exceeds a first threshold value,
        a life assigning processor for assigning a life and a lifespan to the first content based on the user preference for the first content and the preference point, and
        a lifespan adjustor for extending or shortening the lifespan of the first content based on the user preference for the first content that is calculated after the life is assigned to the first content when the life is assigned to the first content.

11. The content lifespan management system of claim 10, wherein the content lifespan management device further comprises a lifespan indicator for visually displaying an aging phenomenon of the first content that indicates shortening of a residual lifespan of the first content.

12. The content lifespan management system of claim 11, wherein the lifespan indicator visually displays the aging phenomenon of the first content using at least one of a first method in which noise is inserted in the first content, a second method in which data of the first content is partially deleted, a third method in which a filter effect for making the first content look aged is applied to the first content, and a fourth method in which a resolution of the first content is reduced.

13. The content lifespan management system of claim 10, wherein the content lifespan management device further comprises
    a revitalization determination processor for determining whether the first content needs to be revitalized when the life is not assigned to the first content or when the lifespan of the first content expires, and
    a preference evaluator for evaluating the user preference for the first content after allowing the first content to be usable by users when the first content needs to be revitalized.

14. The content lifespan management system of claim 10, wherein the content lifespan management device further comprises a lifespan indicator for visually displaying a residual lifespan of the first content and an overall survival time from when the life is assigned to the first content to when the residual lifespan of the first content expires; and the residual lifespan and the overall survival time of the first content are updated in real time.

15. The content lifespan management system of claim 10, wherein the first content is deleted from the content server when the life is not assigned to the first content or when the lifespan of the first content expires.

16. The content lifespan management system of claim 10, wherein the content lifespan management device further comprises a preference evaluator calculating the user preference for the first content in real time, after the life is assigned to the first content, based on at least one of the number of users who mark "like" of the first content, the number of comments written for the first content, the number of first contents called by the content server, and an inputted rating for the first content, and
    wherein the lifespan adjustor extends or shortens the lifespan of the first content by a time corresponding to the calculated user preference.

17. The content lifespan management system of claim 10, wherein the life assigning processor calculates a preference ranking using the user preference for the first content collected for a first period and user preferences for contents of the same category as the first content collected for the first period, and assigns the life and the lifespan to the first content when the user preference for the first content corresponds to a preference ranking that exceeds a second threshold value.

18. The content lifespan management system of claim 14, wherein the lifespan indicator marks one of gold-colored, silver-colored, and bronze-colored edges corresponding to the overall survival time of the first content to the first content.

* * * * *